United States Patent
Chen et al.

(10) Patent No.: US 10,225,290 B2
(45) Date of Patent: Mar. 5, 2019

(54) SYSTEMS AND METHODS FOR EXTENDING DSP CAPABILITY OF EXISTING COMPUTING DEVICES

(71) Applicant: GENBAND US LLC, Plano, TX (US)

(72) Inventors: Weisheng Chen, Allen, TX (US); Hao Hou, McKinney, TX (US); David Z. Lu, Plano, TX (US)

(73) Assignee: GENBAND US LLC, Plano, TX (US)

( * ) Notice: Subject to any disclaimer, the term of this patent is extended or adjusted under 35 U.S.C. 154(b) by 244 days.

(21) Appl. No.: 15/211,946

(22) Filed: Jul. 15, 2016

(65) Prior Publication Data
US 2018/0020027 A1 Jan. 18, 2018

(51) Int. Cl.
*H04L 29/06* (2006.01)

(52) U.S. Cl.
CPC ........ *H04L 65/103* (2013.01); *H04L 65/1006* (2013.01); *H04L 65/1023* (2013.01); *H04L 65/1069* (2013.01)

(58) Field of Classification Search
CPC .......................... H04L 65/103; H04L 65/1006
See application file for complete search history.

(56) References Cited

U.S. PATENT DOCUMENTS

| | | | | |
|---|---|---|---|---|
| 6,594,719 B1 * | 7/2003 | Ahern | ................. | G06F 13/4022 710/300 |
| 6,904,083 B2 * | 6/2005 | Young | ................. | H04L 27/2601 375/222 |
| 7,792,150 B2 * | 9/2010 | Chen | ................... | H04W 88/181 370/401 |
| 8,375,144 B2 * | 2/2013 | Bunch | ................. | H04M 3/4217 709/227 |
| 9,251,801 B2 * | 2/2016 | Grand | .................... | G10L 19/265 |
| 9,438,518 B2 * | 9/2016 | Georg | ..................... | G06F 9/505 |
| 9,614,769 B2 * | 4/2017 | Georg | ..................... | G06F 9/505 |
| 9,667,562 B2 * | 5/2017 | Polk | ....................... | H04L 47/724 |
| 9,674,000 B2 * | 6/2017 | Tsoutsaios | ................ | H04J 3/22 |
| 9,753,878 B2 * | 9/2017 | Wang | ...................... | G06F 1/266 |
| 9,924,303 B2 * | 3/2018 | Ramappa | ............ | H04M 1/7253 |
| 2002/0065568 A1 * | 5/2002 | Silfvast | ................ | G10H 1/0058 700/94 |
| 2003/0220964 A1 * | 11/2003 | Geofroy | .................. | H04L 29/06 709/203 |
| 2004/0015923 A1 * | 1/2004 | Hemsing | ............. | G06F 9/44521 717/154 |

(Continued)

*Primary Examiner* — Jimmy H Tran
(74) *Attorney, Agent, or Firm* — Haynes and Boone, LLP

(57) ABSTRACT

Systems and methods are disclosed for extending digital signal processor (DSP) capability of existing media gateway devices. A system includes a media gateway device, which has a first plurality of voice server cards. Each voice server card comprises a first controller, a first communications interface, and at least one first DSP configured to implement at least one first coder/decoder (codec). The system further includes a communications switch and at least one external DSP server. The external DSP server comprises a second plurality of voice server cards, which each comprise a second controller, a second communications interface, and at least one second DSP configured to implement at least one second codec. The at least one external DSP server is in communication with the media gateway device via the communications switch.

20 Claims, 4 Drawing Sheets

(56) References Cited

U.S. PATENT DOCUMENTS

| | | | | |
|---|---|---|---|---|
| 2006/0034266 A1* | 2/2006 | Harris | ............... | H04M 1/2535 |
| | | | | 370/356 |
| 2007/0041320 A1* | 2/2007 | Chen | ................ | H04W 88/181 |
| | | | | 370/235 |
| 2007/0156909 A1* | 7/2007 | Osborn | ................ | H04L 67/16 |
| | | | | 709/227 |
| 2008/0059197 A1* | 3/2008 | Jones | ................ | G10L 15/30 |
| | | | | 704/270.1 |
| 2009/0170557 A1* | 7/2009 | Chauhan | ............ | H04W 36/14 |
| | | | | 455/552.1 |
| 2011/0252154 A1* | 10/2011 | Bunch | ................ | H04M 3/4217 |
| | | | | 709/230 |
| 2013/0287371 A1* | 10/2013 | Choi | ................ | H04L 65/4084 |
| | | | | 386/353 |
| 2014/0101465 A1* | 4/2014 | Wang | ................ | G06F 1/266 |
| | | | | 713/300 |
| 2016/0119399 A1* | 4/2016 | Glass | ................ | H04N 19/44 |
| | | | | 709/219 |
| 2016/0149984 A1* | 5/2016 | Prajapat | ............ | H04L 65/80 |
| | | | | 370/329 |
| 2017/0185557 A1* | 6/2017 | Jung | ................ | G06F 13/4031 |

* cited by examiner

SYSTEMS AND METHODS FOR EXTENDING DSP CAPABILITY OF EXISTING COMPUTING DEVICES

TECHNICAL FIELD

The present description relates, in general, to systems and techniques for providing extended Digital Signal Processor (DSP) to a group of computing devices and, more specifically, to providing and coder/decoder (codec) availability to a group of computing devices.

BACKGROUND

In applications using a media gateway to facilitate coding, decoding, and transcoding of data, such as Voice Over IP (VOIP) communications, the media gateway accesses a variety of coder/decoders (codecs). For this reason, media gateways typically contain Digital Signal Processor (DSP) chips having firmware capable of implementing multiple codecs.

Some conventional media gateways include voice server cards, where each of the voice server cards has a multitude of DSPs implemented thereon. Each of the DSPs are received from a vendor having firmware to implement certain codecs and a certain number of those codecs. Since the codecs are implemented using firmware, they are not readily changed, thereby making codecs a quasi-hardware feature. Development of new firmware to implement new codecs on a DSP may be expensive.

During design time or even at deployment for a media gateway, engineers typically do not know which specific codecs will be in demand by end-users, nor do the engineers know the quantity of demand. The engineers make a best guess about codec demand. However, in some cases, some users of the media gateway may want access to a new codec that the media gateway currently does not have installed. In some of these cases, adding the new codec may require adding new DSP hardware to the voice server cards of the media gateway. However, it can be expensive to modify voice server cards of the media gateway to hold new DSPs. Accordingly, it is desirable to find a cost effective way to extend the DSP and codec functionality of existing media gateways.

SUMMARY

In one example, a system includes a media gateway, which further comprises a first plurality of voice server cards. Each voice server card comprises a first controller, a first communications interface, and at least one first DSP configured to implement at least one first codec. The system further comprises a communications switch and at least one external DSP server. The at least one external DSP server comprises a second plurality of voice server cards, which each comprise a second controller, a second communications interface, and at least one second DSP configured to implement at least one second codec. The at least one external DSP server is in communication with the media gateway via the communications switch In another example, a computer program product having a computer readable medium tangibly recording computer program logic for facilitating a multimedia communications session, the computer program product including: code to receive messages at a media gateway, the messages transmitted from an external server having a first plurality of codec resources, the messages indicating availability of the first plurality of codec resources; code to, after receiving the messages, store data indicating the availability of the first plurality of codec resources in a data structure with data indicating availability of a second plurality of codec resources, wherein the second plurality of codec resources are provided by the processing chips local to the media gateway; code to receive at the media gateway a request to establish a multimedia communications session; and code to select and apply codecs from among either or both of the first plurality and second plurality of codec resources in response to the request to establish the multimedia communications session.

In another example, a method includes receiving, at a media gateway device, a signal from an external digital signal processor (DSP) server, the signal containing information for a plurality of coder/decoders (codecs) of the external DSP server that are available to the external DSP server; storing information contained within the signal in a local storage of the media gateway device; receiving a request from a first user to connect to a second user for a communications session, wherein the first user encodes its communications with a first coding scheme and the second user encodes its communications with a second coding scheme; and in response to receiving the request from the first user, requesting, from the external DSP server, allocation of a first codec of the plurality of codecs according to the first coding scheme In yet another example, a media gateway device, including: a memory containing a machine readable medium comprising machine executable code having stored thereon instructions for performing a method of requesting allocation of coder/decoder (codec) resources from an external digital signal processor (DSP) server; a processor coupled to the memory, the processor configured to execute the machine executable code to perform the following actions: receive, at the media gateway device, a signal from the external DSP server, the signal containing information for a plurality of codecs of the external DSP server that are available to the external DSP server; store information contained within the signal in a local storage of the media gateway device; receive a request from a first user to connect to a second user for a communications session, wherein the first user encodes its communications with a first coding scheme and the second user encodes its communications with a second coding scheme; and request, from the external DSP server, allocation of a first codec of the plurality of codecs according to the first coding scheme; and after allocation of the first codec, establish the communication including transcoding media using the first codec

DETAILED DESCRIPTION

Figure 1:
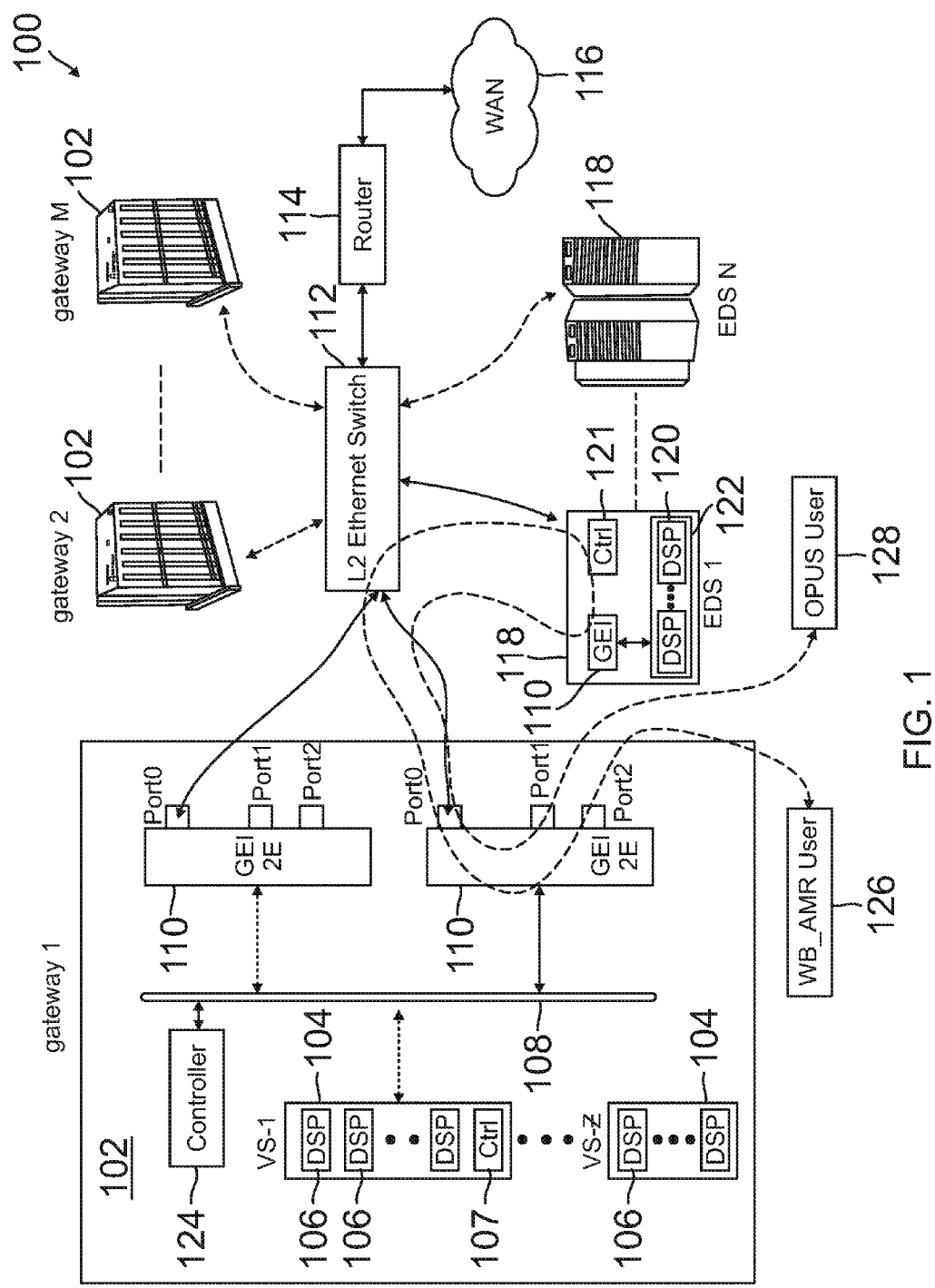
FIG. 1 is an illustration of a diagram of an example system for pooling DSP resources between media gateways, according to one embodiment.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

Various embodiments include systems and methods for pooling processing and firmware resources among a multitude of computing devices. For instance, one embodiment includes systems and methods for pooling coder/decoder (codec) resources among media gateways for use in facilitating communications between users. For example, when a first user wishes to call a second user using Voice Over IP (VOIP), it is possible that each user's communications are encoded with a different coding scheme. Codecs may therefore be useful to the media gateway facilitating the call in order to transcode each user's communications into an appropriate coding scheme that can be decoded by the other user. However, it may not be economical for a media gateway to support all codecs that could possibly be needed to facilitate such calls.

The example embodiment provides servers, which are external to the media gateways and connected to the media gateways by a communications network, those servers including Digital Signal Processors (DSPs) capable of implementing one or more codecs. These external DSP servers may be connected to multiple media gateways via the communications network, and the codecs implemented by DSPs contained in the external DSP servers may be made available for use by each of the media gateways in the system. The DSP pooling may be used to implement some lesser-used codecs, thereby ensuring that more calls are completed, even those calls that might require the lesser used codecs. In another example, DSP pooling may be used to provide extra codecs that may be expected to be more frequently used, thereby allowing for the possibility of load-balancing or other desirable algorithms. In any event, DSP pooling may provide for more efficient sharing of firmware resources among media gateways or other computing devices In one particular example, DSP pooling is provided by techniques for discovering and registering external DSP resources. Continuing with this example, each media gateway may include a plurality of voice server cards, each of the voice server cards including multiple DSPs and control logic. The external DSP servers also include multiple DSPs and control logic. The control logic at the external DSP servers periodically or at other desired times emits a heartbeat signal that includes information about the network address of DSP resources, the types of DSP resources (e.g., types of codecs), the quantity of DSP resources, and the like. The control logic at the voice server cards receives those heartbeat signals and saves the information in those heartbeat signals in a table or other memory structure. The control logic at the voice server cards, being in possession of information regarding DSP resources at the external DSP servers, then treats the external DSP resources in a manner similar to the way it treats internal DSP resources. In other words, the control logic at a particular voice server card advertises both internal and external DSP capabilities to computer management resources of its respective media gateway as resources being available from that voice server card. For example, the control logic at a particular voice server card may advertise each DSP in an external DSP server as a logical DSP in the voice server card, or the control logic may represent an entire external DSP server's resources as a logical DSP in the voice server card.

As call requests are received from users over a telecommunications network, the media gateway consults the DSP resources that it has available at each of its voice server cards. Those DSP resources include DSP resources internal to its voice server cards as well as DSP resources registered from the external DSP server. The media gateway may then select DSP resources, whether physically located internally or at the external DSP server.

Accordingly, the external DSP servers provide virtual DSP resources that are pooled among a variety of media gateways. Of course, the above example is specific to media gateways that use codecs as a firmware resource. However, the concepts described herein are applicable generally to other kinds of computing devices, such as session border controllers (SBCs), media servers, and other computing devices using firmware resources. Also, firmware resources are not limited to codecs, as other embodiments may pool other kinds of firmware resources among different computing devices.

Referring now to FIG. 1, there is illustrated a diagram of a system 100 for pooling DSP resources between media gateways. The system 100 may contain a plurality of media gateways 102. In the present embodiment, media gateways 102 are shown, but it is understood that more or fewer media gateway 102 may be part of the system 100.

For simplicity, the first media gateway 102 will be described as a representative example of the media gateways 102. The media gateway 102 contains one or more voice server cards 104, each of which contain one or more DSPs 106. In an embodiment, each voice server card 104 contains 20 DSPs 106. Each DSP 106 may implement several codecs, which may be referred to as local codecs. To that end, each DSP 106 is designed by its manufacturer to implement specific codecs through use of firmware, and it is generally understood to be prohibitively expensive to modify the DSP 106 to implement additional codecs. Furthermore, a media gateway 102 may have limited space for voice server cards 104 (e.g., 9 card slots may be available, limiting the number of voice server cards 104 to 9), and accordingly may have a limited capacity for DSPs 106 that makes it impossible to add a new DSP 106. Of course, various embodiments may include any appropriate number of card slots or DSPs.

Voice server cards 104 are connected via a bus 108 to one or more external communications interfaces 110. In some embodiments, the bus 108 may be an Ethernet switch, and the external communications interfaces 110 may be Gigabit Ethernet interfaces (e.g., Gigabit Ethernet Network Interface Cards (NICs)). The media gateway 102 connects via external communications interfaces 110 to at least one communications switch 112. In some embodiments, the communications switch 112 may be an Ethernet switch that connects devices over a local network. In some embodiments, the communications switch 112 may further be in communication with a router 114, which further communicates with a Wide Access Network (WAN) 116 such as the Internet. A second communications switch 112 connected to the same devices as the first communications switch 112 may be included in the system 100 for redundancy or extra capacity.

The system 100 further includes one or more External DSP Servers (EDSs) 118. Each EDS 118 contains at least one DSP 120, which implements codecs that may or may not be implemented by the DSPs 106 present in the media gateways 102. The codecs implemented by the external DSPs 120 may be referred to as external codecs because they are physically separate from each of the gateways 102. In this instance, they are in different physical enclosures that are in communication via layer 2 networking. Other communication may be possible, such as by layer 3 (e.g., IP) communications. Each DSP 120 may have a limited capacity for each codec that it implements. For example, 100 concurrent calls (or other types of communications session) may be connected using any given codec. The external DSPs 120 of the EDS 118 may be contained within an external voice server card 122 or any other appropriate hardware. The EDS 118 contains external communications interfaces 110 that allow communication with other devices in the system, such as media gateways 102. Like the media gateway 102's external communications interfaces 110, the external communications interfaces 110 of the EDS 118 may be Gigabit Ethernet interfaces or other appropriate interfaces.

EDSs 118 connect to media gateways 102 via the communications switch 112. The EDSs 118 may connect to communications switch 112 either directly or over the WAN 116 through the router 114. In this manner, media gateway 102 is put into communication with EDSs 118. In the illustrated embodiment, N EDSs 118 are connected to communications switch 112. It is understood that more or fewer EDSs 118 may be present in system 100.

As each EDS 118 is connected to each media gateways 102, and accordingly to each voice server card 104, the external DSPs 120 in the EDS 118 serve as a "pooled" set of DSPs that each voice server card 104 may utilize as if the DSP 120 were part of the voice server card 104. In some embodiments, a controller 124 in media gateway 102 that is connected to voice server cards 104 via bus 108 may coordinate this function. Alternatively, each voice server card 104 may have its own controller 107 to coordinate this function. Each EDS 118 may additionally have its own controller 121 to handle allocation of the resources of DSPs 120, or voice server cards 122 may each have their own controller to allocate those resources.

For example, the controller 124 may process requests from external communications interface 110 to any of the voice server cards 104 in order to route the call through voice server cards 104 containing DSPs 106 that have the proper codecs to transcode the call. In some embodiments, the controller 124 may include a memory that stores a list of codecs implemented by DSPs 106 in the media gateway 102, and corresponding address information to route the call to the proper DSP 106. The DSPs 120 in EDSs 118 may be addressed within controller 124 as if they were local DSPs 106 on media gateway 102. In that manner, external DSPs 120 appear like internal DSPs 106 to users of media gateway 102.

In an exemplary embodiment, media gateways 102 and EDSs 118 are used to facilitate voice communications between a first user 126 and a second user 128. In this embodiment, each user is connecting to a voice call with a different coding scheme, and thus two codecs are used to transcode the communications as they travel back and forth between first user 126 and second user 128. For example, first user 126 may be using wideband Adaptive Multi-Rate (WB AMR) encoding, while the second user 128 may be using Opus encoding.

In this embodiment, first user 126 and second user 128 are connected to a media gateway 102 for a voice call. The DSPs 106 in media gateway 102 are not able to implement one or both of the codecs necessary to transcode the voice communications between the users. An EDS 118, however, contains one or more DSPs 120 that are able to implement the necessary codec or codecs. As described above, the media gateway 102 is aware of the capabilities of the EDS 118 and of how to address communications to the EDS 118.

Accordingly, the controller 124 of media gateway 102 may recognize that external DSPs 120 may be used to transcode the communications from first user 126 to second user 128, and may route the communications from the media gateway 102 through the communications switch 112 to the EDS 118 for transcoding by a DSP 120 contained in EDS 118. In some embodiments, a first codec to encode and decode a first user 126's communications may be implemented on an internal DSP 106, while a second codec to encode and decode the second user 128's communications may be implemented on an external DSP 120.

Other media gateways 102 (e.g., numbers 2-M) may be connected via the communications switch 112, either directly or over the WAN 116, to the EDSs 118. In this manner, an EDS 118 is a pooled resource available to each media gateway 102. This provides efficiency in cases where the codecs implemented by DSPs 120 are rarely used by media gateways 102, allowing one DSP 120 to serve the users of each media gateway 102. Pooling may also provide extra capacity for codecs that are more often used. An advantage provided by some embodiments is that they may offer efficient use of a finite number of codecs among multiple gateways. As multiple media gateways 102 may be simultaneously looking to use a single codec of an EDS 118, the controllers 124 of the media gateways 102 and the controllers 121 of EDSs 118 may schedule the usage of each codec implemented on an EDS 118 among multiple media gateways 102.

Figure 5:
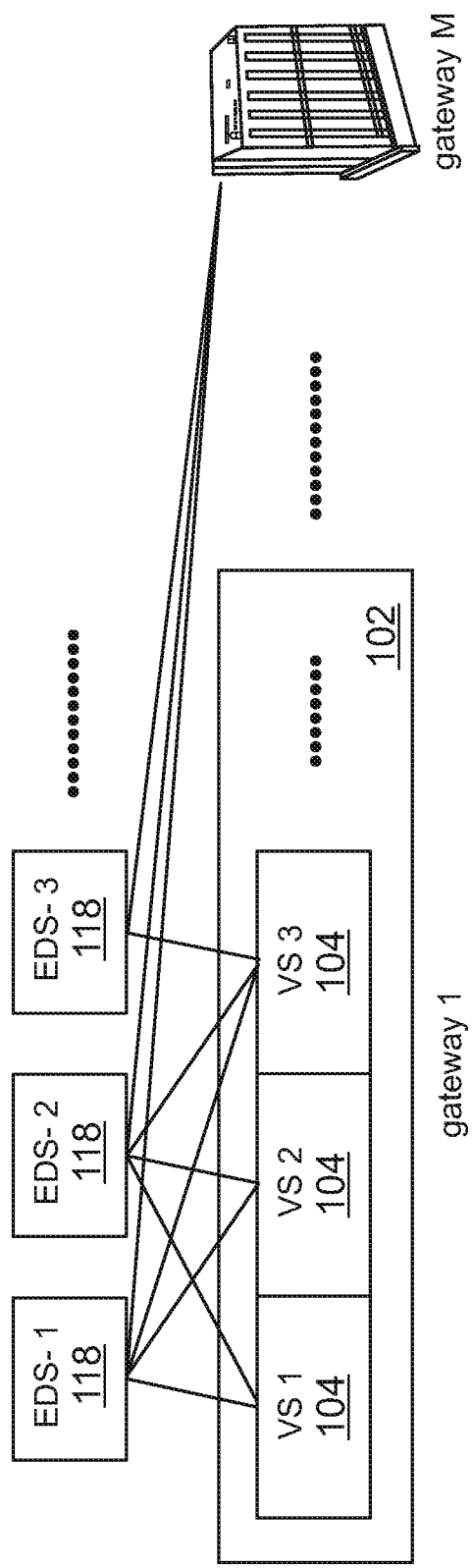
FIG. 5 is an illustration of a block diagram showing an example architecture for use with the system of FIG. 1, according to one embodiment.

Referring now to FIG. 5, there is illustrated an example architecture for logical connection in the system of FIG. 1. In the embodiment of FIG. 5, there are multiple gateways 102 (gateway 1-M) and multiple EDSs 118 (EDS 1-N), and each gateway 102 includes multiple voice server cards 104 (VS 1-Z), where each of M, N, Z is a positive integer.

Further in this example, each of the voice server cards 104 is in communication with each of the EDSs. Or put another way, voice server card VS 1 is in communication with each one of the EDSs 1-N, as are the other voice server cards 2-Z. Therefore, each voice server card 104 of gateway 1 may register the DSP capabilities of each of the EDSs 118 and then advertise those DSP capabilities as available to gateway 1. Each of the other gateways 2-M is similarly arranged, having multiple voice server cards 104 in communication with multiple ones of the EDSs 118. Furthermore, during normal use of the system, each of the voice server cards 104 may use the resources of a given EDS 118 to perform transcoding.

Of course, each of the different gateways 102 may use a different number of voice server cards 104 or use the same number of voice server cards 104, as appropriate. Additionally, some embodiments may include each of the voice server cards 104 being in communication with each of the other EDS is 118, whereas other embodiments may include one or more voice cards 104 in one or more gateways 102 that are in communication with fewer than all EDSs 118. System architectures may vary, depending upon available bandwidth, number of licenses for particular codecs, and the like. System architectures may be designed with these and other constraints in mind to provide an appropriate number and type of codec resources.

Figures 2, 3:
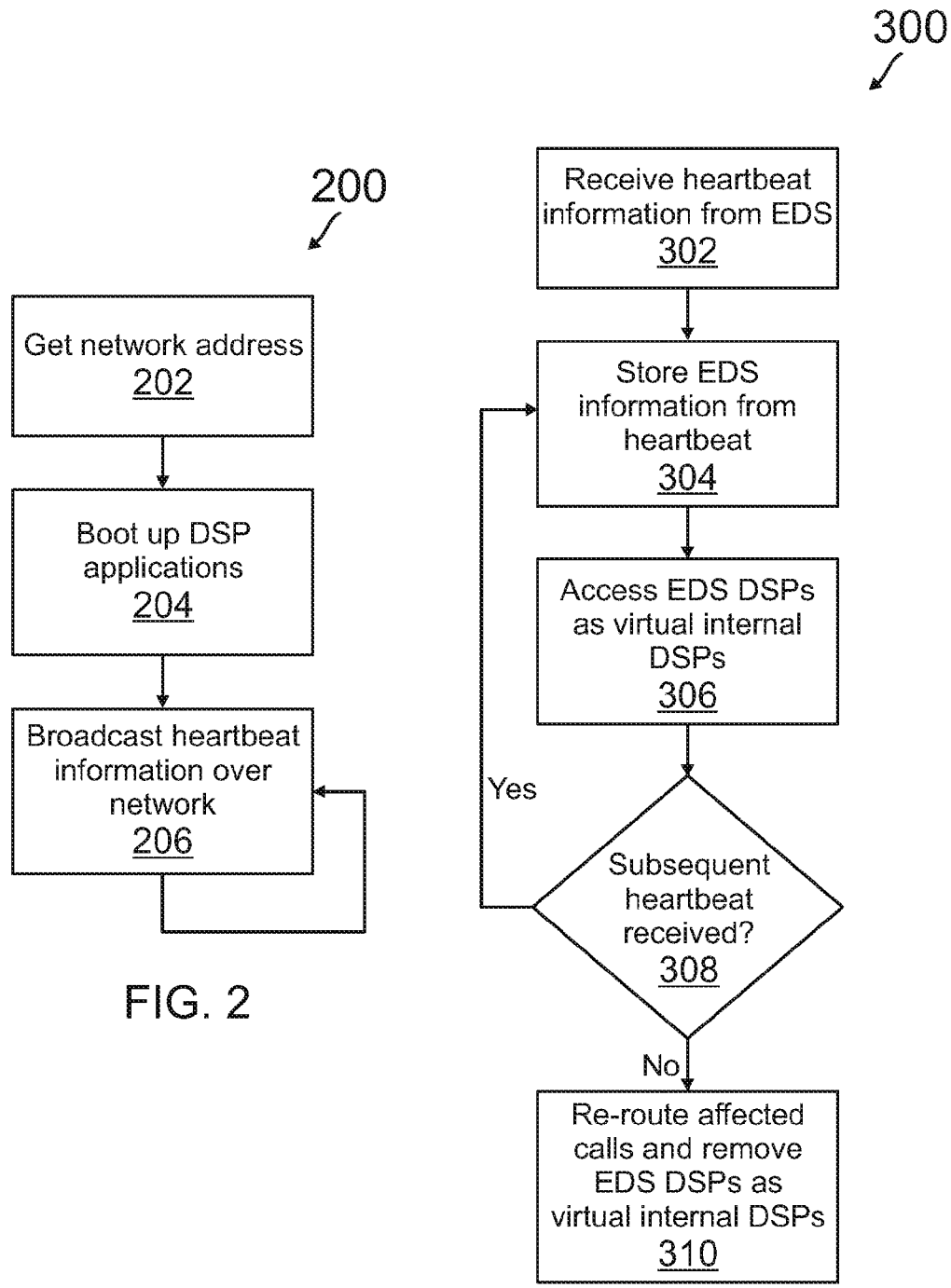
FIG. 2 is an illustration of a block diagram of an example method for booting up an external DSP server and connecting it to media gateways, according to one embodiment.
FIG. 3 is an illustration of a block diagram of an example method for connecting a media gateway with an external DSP server to facilitate communications between users, according to one embodiment.

Referring now to FIG. 2, there is illustrated a block diagram of a method 200 for booting up an EDS 118 and connecting it to media gateways 102. At block 202, after booting up, the EDS 118 retrieves a network address for itself. In some embodiments, the network may be an Internet Protocol (IP) network, and the network address may be an IP address. In this case, the EDS 118 may retrieve its IP address from a Dynamic Host Configuration Protocol (DHCP) server (not pictured). In other embodiments, the network address may be a local network address, and the communications switch 112 may assign the network address to the EDS 118. Each voice server card 104 or DSP 120 may have its own network address in some embodiments.

At block 204, the EDS 118 boots up its DSP applications. This may include, for example, any applications necessary to implement codecs, schedule communications with media gateways 102, or the like. In some embodiments, the applications may be stored in a local storage, either within the EDS 118 or on each voice server card 122. In one embodiment, the applications include the firmware as computer-executable code stored to computer-readable media within the hardware of a DSP chip 120. During boot up, a given DSP chip 120 accesses the computer-executable code from the computer-readable media and executes that code to provide the functionality of the codecs themselves, as well as other functionality such as control functionality. Block 204 may further include EDSs 118 booting up control application 121, interface functionality of interface 110, and/or the like.

At block 206, the EDS 118 broadcasts a "heartbeat" signal to other devices in system 100, such as media gateways 102. The heartbeat signal is an indication that a given EDS 118 is operative. The heartbeat signal of this example also includes information that media gateways 102 can use to register the capabilities of the EDS 118, thereby allowing them to utilize external DSPs 120 to facilitate transcoding for users such as first and second users 126 and 128. Each DSP may broadcast its own heartbeat, or controller 121 may broadcast a cumulative heartbeat signal including information for each external DSP 120. The heartbeats are broadcast periodically to ensure that media gateways 102 being brought onto the network can connect to the DSPs 120, and to act as a notification to the media gateways 102 that the EDS 118 and its DSPs 120 are still online.

Additionally or alternatively, the heartbeats may be sent in response to triggering events, for example each time an EDS 118 communicates with a media gateway 102 for other purposes it may also send heartbeat information. In such an embodiment, the heartbeat information piggybacks on other communications to keep the gateways 102 apprised of current DSP capabilities.

The heartbeats may include the network address (e.g., IP and/or MAC address) of the EDS 118 or DSPs 120, the capabilities of each DSP 120 (e.g., the respective codecs that are implemented on each DSP 120), the capacity of each codec (e.g., how many voice calls may be handled on each codec at a given time), and the like.

Referring now to FIG. 3, there is illustrated a block diagram of a method 300 for connecting a media gateway 102 with an EDS 118 to facilitate communications between users such as first user 126 and second user 128. At block 302, after powering on, the media gateway 102 begins to receive heartbeats from EDSs 118. In some embodiments, each voice server card 104 may receive heartbeats. As discussed above, the heartbeats contain information including a network address of the EDS 118 or its DSPs 120, the capabilities of each DSP 120, the capacity of each codec of each DSP 120, and the like.

At block 304, the media gateway 102 stores the heartbeat information locally for later use. For example, the network address, DSP 120 capabilities, and codec capacities may be stored in separate tables in a local storage media (e.g., a volatile or nonvolatile random access memory) in media gateway 102 for later reference. In some embodiments, the heartbeat information may be stored in local storages within each voice server card 104 or each DSP 106.

At block 306 the media gateway 102 uses the stored heartbeat information to access the codec capabilities of the external DSPs 120 to facilitate voice or multimedia communications sessions among users as if the media gateway 102 itself had those capabilities locally (i.e., the media gateway 102 treats the external DSPs 120 as virtual internal DSPs). In one example, the controller 124 of the gateway 102 tracks the available DSP capabilities advertised by each of its voice server cards 104, where those capabilities include both local and external DSP capabilities.

The provisioning of the DSP capabilities may be seamless from the point of view of a user at a telecommunication end point participating in a communications session. For example, a first user 126 requesting to set up a call with a second user 128 through media gateway 102 would employ a client that would perform the usual call setup handshaking and negotiation, including selection of appropriate codecs. An example includes use of Session Initiation Protocol (SIP), which defines certain actions when setting up and tearing down calls, including negotiation of codecs. In other embodiments, a protocol such as Bearer Independent Call Control (BICC) or Extensible Messaging and Presence Protocol (XMPP) may be used for call setup and teardown. The gateway 102 works with both the first user 126 and the second user 128 to select one or more appropriate codecs, whether those codecs are implemented locally to the gateway 102 or externally in a DSP server 118. In this way, DSP capabilities at a server 118 may be seen as virtual DSP capabilities because they are not located physically at a gateway 102, but they may be used in a same or similar manner as local DSP capabilities would be used.

At decision block 308, the media gateway 102 monitors for subsequent periodic heartbeats from the EDS 118. If a subsequent heartbeat is received, the method 300 returns to block 304 and progresses accordingly. If no subsequent heartbeat is received, the method 300 moves to block 310.

At block 310, the media gateway 102 treats the EDS 118 as having failed. Accordingly, the media gateway 102 attempts to re-route any calls using codecs implemented in external DSPs 120 of the failed EDS 118. For example, if another EDS 118 implements the same codec, the call may be rerouted through the other EDS 118. If no other DSP, either internal or external, is known which implements a codec used for a call, the call may be disconnected. Furthermore, the media gateway 102 removes the external DSPs 120 from the available options presented to users 126 and 128 for connecting a call (i.e., the media gateway 102 stops treating the external DSPs 120 of EDS 118 as virtual internal DSPs).

Figure 4:
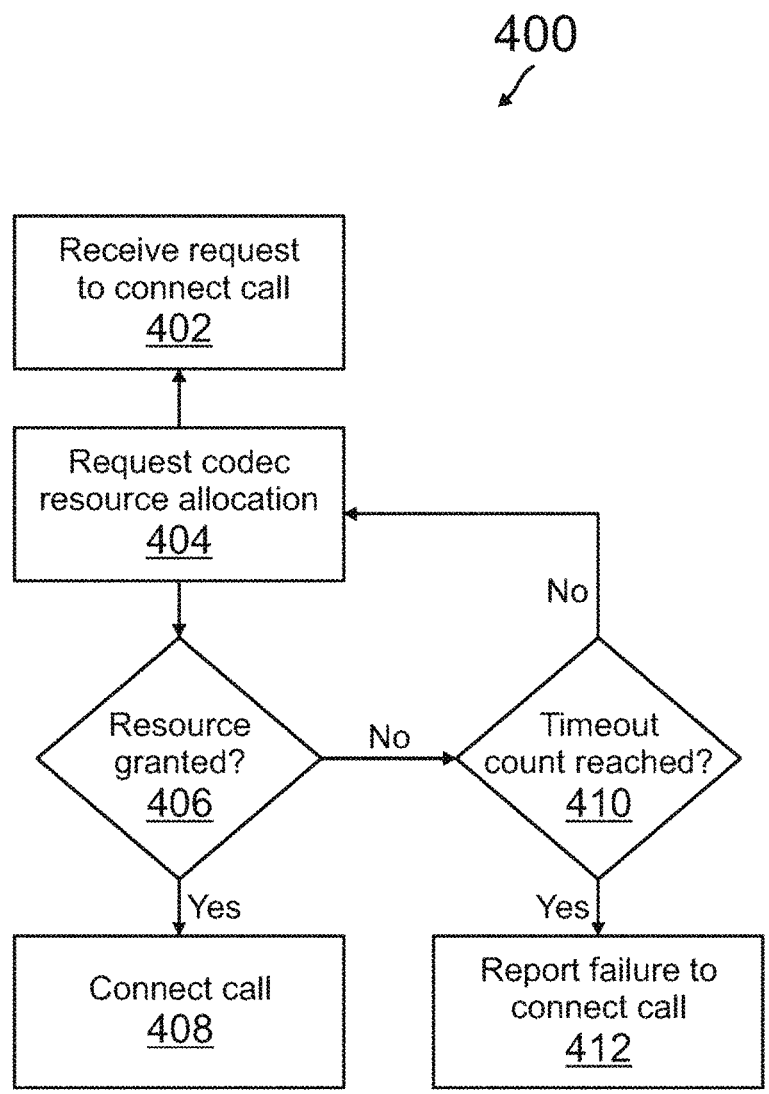
FIG. 4 is an illustration of a block diagram of an example method for connecting a call from a media gateway using codecs implemented on an external DSP of an external DSP server, according to one embodiment.

Referring now to FIG. 4, there is illustrated a block diagram of a method 400 for connecting a call from a media gateway 102 using codecs implemented on an external DSP 120 of an EDS 118. At block 402, a media gateway controller (not pictured) receives a request to connect a call from a calling user (e.g., first user 126) to a called user (e.g., second user 128). The request to connect the call may include information on the codec used by the calling user. The media gateway controller may contact the called user to determine a codec used by the called user, such as according to SIP or other protocol. Although the media gateway in this example does not communicate directly with the users, the media gateway interacts with the users indirectly by responding to requests from the media gateway controller.

At block 404, the media gateway 102 requests the allocation of a codec resource from an external DSP 120 on a media gateway 102. For example, as described above the media gateway 102 may have a table of information stored in local memory that includes a network address for each DSP 120 (or EDS 118) as well as the available codec resources of each DSP 120 (i.e., the heartbeat information). Based on this information, the media gateway 102 may choose an external DSP 120 on an EDS 118 that has available resources to encode and decode for one or both users, and the media gateway 102 may contact the chosen DSP 120 or EDS 118 to request allocation of the resource.

At decision block 406, the EDS 118 or DSP 120 responds to the request, either confirming or denying the requested allocation of resources (e.g., either allocating the requested codec or not allocating the requested codec). In some embodiments, each time a DSP 120 or EDS 118 responds to media gateway 102, it includes updated heartbeat information so that the media gateway 102 has current knowledge of available resources. In a further embodiment, the DSP 120 or EDS 118 may fail to respond. If the request was granted, the method 400 moves to block 408. If the request was not granted or no response was received, the method 400 moves to decision block 410.

At block 408, once the request for allocation of codec resources from a DSP 120 or EDS 118 has been granted, the media gateway 102 connects the call between the caller and the called user. In some embodiments, one user's codec (e.g., user 126's codec) may be handled by an internal DSP 106 on media gateway 102 while the other user's codec (e.g., user 128's codec) is handled by an external DSP 120 on an EDS 118. In other embodiments, both codecs may be handled on one external DSP 120 on an EDS 118, or one codec may be handled by one DSP 120 on an EDS 118 and the second codec may be handled by a second DSP 120 either on the same EDS 118 or on another EDS 118. Put another way, the media gateway 102 may select any of its available codec resources, whether internal on a voice server card 104 or external on a server 118.

Transcoding includes actions during transfer of voice, video, or other data during a communications session to encode and decode the data according to available resources. For instance, first user 126 may use an AMR codec, and second user 128 may use an OPUS codec, and the selected DSP capabilities may decode from AMR and encode into OPUS in one direction and decode from OPUS and encode in AMR in the other direction.

Returning to decision block 406, if the request for resources was not granted, the method moves to decision block 410.

At decision block 410, the media gateway 102 checks a timeout counter stored locally to determine whether a pre-specified number of attempts to request resource allocation have been made. For example, the media gateway 102 may make 2-3 requests for allocation of resources. This number may be based on the determination that a user is willing to wait a certain window of time before being told their call cannot be connected, and the threshold number of attempts may be set accordingly based on the amount of time each attempt takes. If the attempt limit has not been reached, the timeout counter is incremented and the method 400 returns to block 404 to make another request for the resources. If the attempt limit has been reached, the method 400 moves to block 412.

At block 412, the media gateway 102 informs the caller that the call cannot be connected. In some embodiments, this may include informing the caller that the codec resources were not available and that the caller may attempt to try again later.

Various embodiments of the present disclosure may include advantages over prior solutions. Conventional media gateways are generally limited to the codecs that are implemented on DSPs locally contained within voice server cards of the media gateway. Addition of new codecs may be expensive, for example because a DSP manufacturer must be commissioned to implement the codec on a DSP already contained within the media gateway, or a voice server card in a media gateway must have its design amended to contain a new DSP that implements the codec.

Furthermore, some codecs may be relatively infrequently used, making it difficult to justify implementing such a codec on a multitude of individual media gateways. In such cases, an external DSP that is pooled with multiple media gateways in a system may provide an economical solution by providing new codec capabilities to multiple media gateways without incurring the increased cost of implementing the codec locally on voice server cards for each media gateway. Additionally, codecs that are frequently used may also be implemented in pools on external DSP servers. During design time it may not be feasible to know how demand spikes may affect availability of implemented codecs. However, a service provider in charge of a media gateway observes use of the media gateway as it sets up and tears down calls during normal use, and that service provider may observe that demand may exceed availability of certain codecs during certain times of day. Accordingly, that service provider may add more quantity of that codec in an external DSP server in order to pool those resources. During times of high demand, the particular media gateway and other media gateways may then access the pooled codecs even as their internal codec resources may be fully utilized.

The embodiments described herein are specifically illustrated with respect to media gateways and DSPs, with codecs being a particular firmware capability that is both utilized locally and pooled through external resources. The scope of embodiments includes the concept of pooling finite firmware resources among a multitude of computing devices, even outside of the specific implementations using DSPs and codecs. For example, a SBC, media server, or other computing device may use local control resources to discover and track available firmware capability that is both local and provided externally in a server. In such instances, the server may include DSPs or other processing circuitry, such as application-specific integrated circuits (ASICs), field programmable gate arrays (FPGAs), and/or the like. Similar to the examples above, the processing circuitry may use heartbeat signals or other signals to provide information regarding the address, type, and quantity of firmware resources. The computing devices may then receive that information, store that information and then treat the external hardware resources in a same or similar manner as internal hardware resources to facilitate transmission of media, such as by transcoding or other processing.

Various embodiments may be implemented using processing circuitry, such as a general-purpose computer processor, an ASIC, an FPGA, a DSP or other appropriate circuitry that accesses computer-executable code from computer-readable media to provide the functionality herein. For instance, the actions of FIG. 2 may be performed by the DSPs 120 of a given server 118, whereas the broadcasting of action 206 may be performed either by the DSPs 120 themselves, a processor implementing control functionality 121 of server 118, or a mixture thereof.

Similarly, the actions of FIG. 3 may be performed by one or more computer processors implemented by either a voice server card 104 and/or a gateway processor implementing controller functionality 124. The actions of FIG. 4 may also be performed by one or more computer processors implemented by either a voice server card 104 and/or a gateway processor implementing controller functionality 124. The transcoding itself may be performed by DSPs 106 local to a voice server card 104 and/or DSPs 120 at an external DSP server 118.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

What is claimed is:

1. A computer program product having a non-transitory computer readable medium tangibly recording computer program logic for facilitating a multimedia communications session, the computer program product comprising:
   code to receive messages at a media gateway, the messages transmitted from an external server having a first plurality of codec resources, the messages indicating availability of the first plurality of codec resources;
   code to, after receiving the messages, store data indicating the availability of the first plurality of codec resources in a data structure with data indicating availability of a second plurality of codec resources, wherein the second plurality of codec resources are provided by processing chips local to the media gateway;
   code to receive at the media gateway a request to establish a multimedia communications session; and
   code to select and apply codecs from among either or both of the first plurality and second plurality of codec resources in response to the request to establish the multimedia communications session.

2. The computer program product of claim 1, wherein the first plurality of codec resources comprise computer-executable code stored to a first plurality of digital signal processors (DSPs) at the external server.

3. The computer program product of claim 1, wherein the second plurality of codec resources comprise computer-executable code stored to a second plurality of digital signal processors (DSPs) at the media gateway.

4. The computer program product of claim 3, wherein the second plurality of DSPs are physically located on a plurality of voice server cards at the media gateway.

5. The computer program product of claim 1, wherein the code to select and apply codecs comprises code to establish the multimedia communications session according to Session Initiation Protocol (SIP).

6. The computer program product of claim 1, further comprising:
   code to receive messages at the media gateway, messages transmitted from an additional external server having a third plurality of codec resources; and
   code to store data indicating the availability of the third plurality of codec resources in the data structure.

7. The computer program product of claim 1, wherein the media gateway communicates with the external server remotely via an Ethernet switch.

8. A method, comprising:
   receiving, at a media gateway device, a signal from an external digital signal processor (DSP) server, the signal containing information for a plurality of coder/decoders (codecs) of the external DSP server that are available to the external DSP server;
   storing information contained within the signal in a local storage media of the media gateway device;
   receiving a request from a first user to connect to a second user for a communications session, wherein the first user encodes its communications with a first coding scheme and the second user encodes its communications with a second coding scheme; and
   in response to receiving the request from the first user, requesting, from the external DSP server, allocation of a first codec of the plurality of codecs according to the first coding scheme.

9. The method of claim 8, wherein the signal is received periodically.

10. The method of claim 8, wherein the signal contains address information for the external DSP server.

11. The method of claim 8, further comprising:
    receiving, from the external DSP server, allocation of the first codec.

12. The method of claim 11, further comprising:
    establishing the communications session between the first and second users with the first codec contained.

13. The method of claim 12, further comprising:
    performing transcoding in the communications session using at least one codec associated with a DSP contained in the media gateway device.

14. The method of claim 11, further comprising:
    storing information regarding a local codec in the local storage media along with the information contained in the signal.

15. The method of claim 11, further comprising:
    monitoring, at the media gateway device, for a subsequent signal from the external DSP server; and
    upon failing to receive the subsequent signal from the external DSP server, re-routing communications between the first and second users that use the first codec.

16. The method of claim 8, further comprising:
    failing to receive, from the external DSP server, allocation of a second codec.

17. The method of claim 16, further comprising:
    attempting a request for allocation of the second codec until a threshold number of attempts to request is reached; and
    upon reaching the threshold number of requests, reporting a failure to facilitate a subsequent communications session.

18. A media gateway device, comprising:
    a memory containing a non-transitory machine readable medium comprising machine executable code having stored thereon instructions for performing a method of requesting allocation of coder/decoder (codec) resources from an external digital signal processor (DSP) server;
a processor coupled to the memory, the processor configured to execute the machine executable code to perform the following actions:
receive, at the media gateway device, a signal from the external DSP server, the signal containing information for a plurality of codecs of the external DSP server that are available to the external DSP server;
store information contained within the signal in a local storage of the media gateway device;
receive a request from a first user to connect to a second user for a communications session, wherein the first user encodes its communications with a first coding scheme and the second user encodes its communications with a second coding scheme; and
request, from the external DSP server, allocation of a first codec of the plurality of codecs according to the first coding scheme; and
after allocation of the first codec, establish the communication including transcoding media using the first codec.

19. The media gateway device of claim 18, further comprising:
transcoding the media using a second codec implemented on a DSP local to the media gateway device.

20. The media gateway device of claim 19, wherein the media gateway device and the external DSP server are coupled via layer 2 or layer 3 switching.

* * * * *